(12) United States Patent
Zalitzky et al.

(10) Patent No.: US 8,235,322 B1
(45) Date of Patent: Aug. 7, 2012

(54) HANDLING EXCESS OPTICAL FIBER

(75) Inventors: Yeshayahu Zalitzky, Raanana (IL);
Avner Safrani, Beer Sheva (IL)

(73) Assignee: Teliswitch Solutions Ltd., Kfar Saba (IL)

( * ) Notice: Subject to any disclaimer, the term of this patent is extended or adjusted under 35 U.S.C. 154(b) by 0 days.

(21) Appl. No.: 12/380,186

(22) Filed: Feb. 24, 2009

Related U.S. Application Data

(60) Provisional application No. 61/030,965, filed on Feb. 24, 2008.

(51) Int. Cl.
*B65H 75/48* (2006.01)
(52) U.S. Cl. .................. 242/378.2; 242/378.3
(58) Field of Classification Search .......... 242/378, 242/378.1–378.3
See application file for complete search history.

(56) References Cited

U.S. PATENT DOCUMENTS

| | | | |
|---|---|---|---|
| 4,384,688 A * | 5/1983 | Smith | 242/378.2 |
| 5,332,171 A * | 7/1994 | Steff | 242/378 |
| 6,726,140 B2 * | 4/2004 | Wivagg | 242/378.2 |
| 6,915,058 B2 * | 7/2005 | Pons | 385/135 |
| 7,229,042 B2 * | 6/2007 | Thebault et al. | 242/388.1 |
| 7,315,681 B2 * | 1/2008 | Kewitsch | 385/135 |
| 7,680,386 B2 * | 3/2010 | Hurley | 385/135 |

\* cited by examiner

*Primary Examiner* — Sang Kim
(74) *Attorney, Agent, or Firm* — D. Kliger IP Services Ltd.

(57) ABSTRACT

A fiber storage unit, including a base, a ring adapted to rotate relative to the base and a fiber fixedly attached at a first point to the base and at a second point to the ring. The fiber is attached in a manner that the fiber portion between the first and second points is arranged as a spiral which changes its number of rounds when the ring is rotated relative to the base, but the fiber portion beyond the first point is not substantially twisted by rotation of the ring. The fiber preserves a bending radius above a critical bending radius of the fiber.

20 Claims, 5 Drawing Sheets

HANDLING EXCESS OPTICAL FIBER

PRIORITY INFORMATION

The present invention claims priority to U.S. Provisional Patent Application No. 61/030,965 filed on Feb. 24, 2008, making reference to same herein in its entirety.

FIELD OF THE INVENTION

The present invention relates to storage systems for fibers and in particular for the storage of optical fibers.

BACKGROUND OF THE INVENTION

Optical fibers carrying light signals are currently one of the basic telecommunication conduits. Optical fibers are relatively delicate and must be handled with care to avoid harsh twisting or bending which may attenuate their light transmission properties or even cause breakages.

U.S. Pat. No. 7,229,042 to Thebault et al., titled: "Packaging Reel with an Optical Fiber Unwinding Device", the disclosure of which is incorporated herein by reference in its entirety, describes an optical fiber packaging device in which an optical fiber cable is stored in two compartments, from which opposite ends of the optical fiber cable can be pulled out. When an inner spool of the device is rotated, a cable section from a first compartment is unwound, while the cable section from the second compartment is wound back in to the device.

In mechanical optical switches, excess optical fiber tails are provided to allow connecting the ends of the optical fibers at different locations within the switch. Therefore, solutions for handling such excess fiber tails are needed for states of the switch in which the tails are not required. Such solutions need to allow repeated movements between different states.

U.S. Pat. No. 5,337,378 to Saito et al., titled: "Optical Fiber Switch Including Partitions for Restricting Surplus Fibers", the disclosure of which is incorporated herein by reference in its entirety, describes a switch with partitions that prevent the excess fiber tails from moving outside of a confined area. The use of partitions, however, limits the movements of the fibers.

U.S. Pat. No. 5,386,485 to Saito et al., titled: "Optical Fiber Switching Device Having an Optical Fiber Length Adjustment Unit and Method for Using the same", the disclosure of which is incorporated herein by reference in its entirety, describes another system for handling excess fiber, based on a pair of reels urged by a spring. The excess fiber is stored in an unorganized manner within a closed unit. Such unorganized storage, is practical only for relatively short fiber extents, as for longer lengths the fiber may bend in a damaging manner.

SUMMARY OF THE INVENTION

An aspect of some embodiments of the present invention relates to a fiber storage device including a rotating ring, onto which a fiber is wrapped, and an internal fiber arrangement which absorbs the rotation effect of the ring on the fiber, such that an opposite end of the fiber is not twisted or otherwise affected by the rotation of the ring.

There is therefore provided in accordance with an exemplary embodiment of the invention, a fiber storage unit, comprising a base, a ring adapted to rotate relative to the base; and a fiber fixedly attached at a first point to the base and at a second point to the ring, in a manner that the fiber portion between the first and second points is arranged as a spiral which changes its number of rounds when the ring is rotated relative to the base and preserves a bending radius above a critical bending radius of the fiber, but the fiber portion beyond the first point is not substantially twisted by rotation of the ring.

Optionally, the base comprises a pivot around which the ring rotates. Optionally, the fiber portion between the first and second attachment points is arranged so that at least a part thereof rests on the pivot. Optionally, the fiber storage unit includes a rotatable wall attached to the ring, which rotates with the ring. Optionally, the base comprises a stationary wall which together with the rotatable wall and the ring defines a recess in which the spiral fiber portion is positioned. Optionally, the fiber portion between the first and second attachment points is arranged so that at least a part thereof rests on a circular protrusion from the stationary wall, having a radius greater than a critical radius of curvature of the fiber.

Optionally, the fiber storage unit includes a pair of walls on opposite sides of the ring, and wherein the fiber portion between the first and second attachment points is confined within a volume defined by the walls and the ring. Optionally, a first one of the walls rotates with the ring and a second one of the plates is stationary relative to the ring. Optionally, the fiber passes through an opening in the stationary wall. Optionally, an outer surface of the ring is adapted to have a portion of the fiber wrapped there around.

Optionally, the fiber storage unit includes a rail on the ring which prevents the fiber on the ring from slipping off. Optionally, the ring has rails on both sides, which rotate with the ring. Optionally, the fiber comprises an optical fiber. Optionally, the fiber is degraded substantially if twisted more than two rounds. Optionally, the fiber comprises a fiber which is degraded substantially if bent at an angle smaller than defined by a critical angle of curvature of the fiber. Optionally, the fiber storage unit includes a spring coupling the ring to the base.

Optionally, the spring is adapted to exert force toward a state in which substantially the entire fiber portion beyond the second point is wrapped around the ring. Optionally, the spring is located in an internal recess of the spiral fiber portion. Alternatively, the spring extends along the spiral fiber portion. Optionally, the fiber portion beyond the first point is not substantially moved by rotation of the ring.

There is further provided in accordance with an exemplary embodiment of the invention, a method of handling a fiber, comprising connecting the fiber to a storage reel at a first point which is stationary and at a second point which is rotatable, such that the fiber between the first and second points is organized as a spiral, wrapping the fiber around a ring of the reel, by rotating the ring and wrapping and unwrapping the fiber from the ring for usage of different lengths of the fiber.

BRIEF DESCRIPTION OF FIGURES

Exemplary non-limiting embodiments of the invention will be described with reference to the following description in conjunction with the figures. Identical structures, elements or parts which appear in more than one figure are preferably labeled with a same or similar number in all the figures in which they appear, in which.

DETAILED DESCRIPTION OF EMBODIMENTS

Reel Overview

Figure 1:
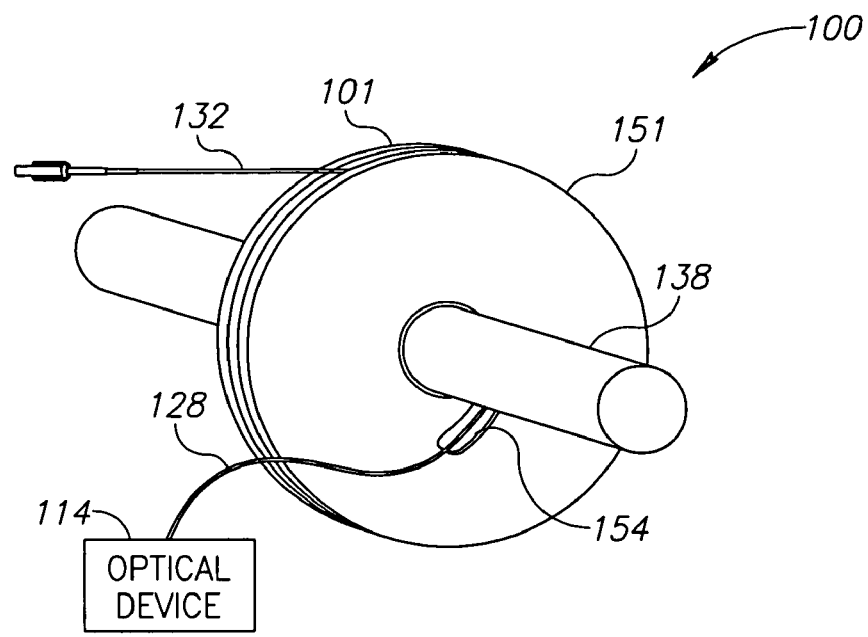
FIG. 1 is a schematic illustration of an optical fiber storage reel, in accordance with an exemplary embodiment of the invention.
Figure 2:
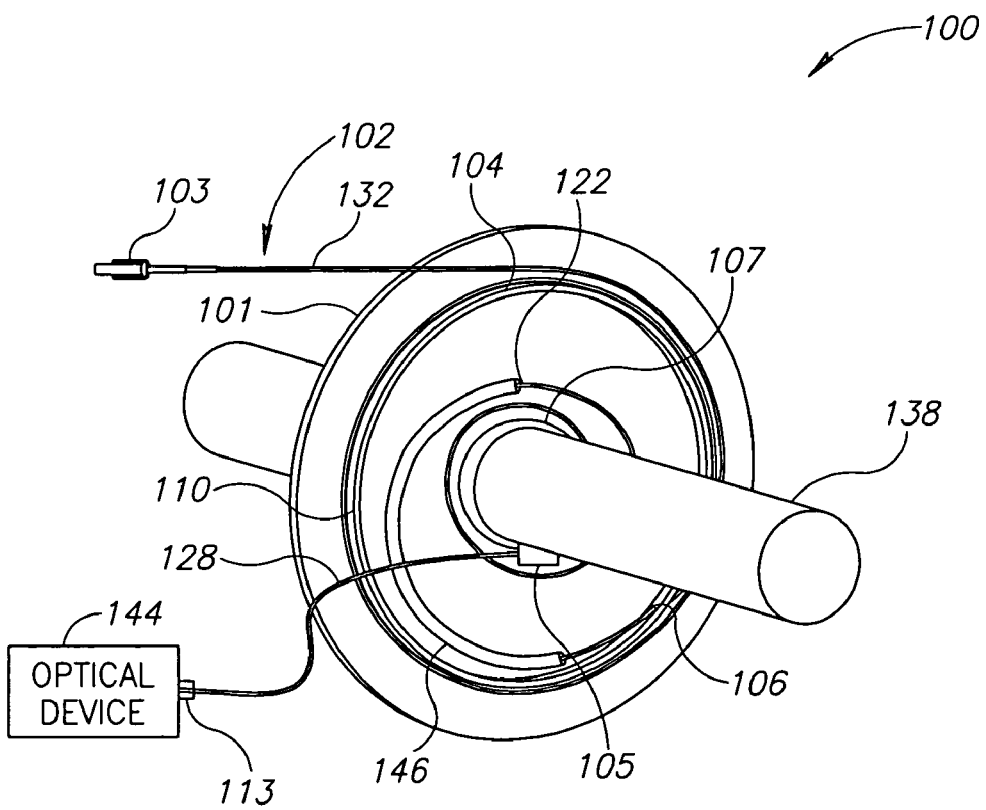
FIG. 2 is a schematic illustration of the reel of FIG. 1, with a front wall removed.

FIG. 1 is a schematic illustration of an optical fiber storage reel 100, in accordance with an exemplary embodiment of the invention. FIG. 2 is a schematic illustration of reel 100 with a front wall 151 removed, so that inner elements of the reel 100 are shown.

Reel 100 optionally comprises a shaft 138 and a rotatable ring 104 (FIG. 2), adapted to rotate around shaft 138. Ring 104 has an outer peripheral surface 110 suitable for wrapping an optical fiber 102 thereon.

Optical fiber 102 is optionally fixed to rotatable ring 104 at an anchor point 106, for example by a clamp and/or an adhesive. The length of a useable fiber portion 132 of optical fiber 102, from anchor point 106 to an end connector 103 is optionally predetermined and defines the length of optical fiber 102 which may be pulled out of reel 100. An opposite end of fiber 102 may also be terminated by an optical connector 113 and/or may be attached directly to an optical source, spectrophotometer, splice connector, switch or other optical device 144. Close to opposite end connector 113, optical fiber 102 is optionally connected to shaft 138, at an inner anchor point 105, such that the portion 122 of fiber 102 between anchor points 105 and 106 is of substantially constant length. The portion 122 of optical fiber 102 between anchor points 106 and 105 is optionally arranged in a spiral, which is expanded and contracted, as usable fiber portion 132 is wrapped or unwrapped on ring 104, respectively, as discussed in detail below.

A portion 128 of optical fiber 102, between optical device 144 and inner anchor point 105 is optionally of a substantially minimal length required to connect to optical device 144, without excess material, which could snag or otherwise interfere with operation of humans or other devices. It is noted, however, that optical fiber portion 128 may be longer if required for some reason.

Shaft 138 is optionally held stationary, such that it does not rotate with ring 104, and therefore fiber portion 128 is stationary and is not twisted or otherwise affected by wrapping and/or unwrapping of useable fiber portion 132. Instead, when the useable fiber portion 132 is wrapped on ring 104, one or more of the loops of spiral fiber portion 122 increases in diameter, compensating for the rotation of ring 104. When the useable fiber portion 132 is unwrapped from ring 104, one or more of the loops of spiral fiber portion 122 decrease in size to compensate for the rotation of ring 104.

Optionally, a wall 101 adjacent to ring 104 prevents spiral fiber portion 122 from slipping out of ring 104 in a first direction. Similarly, an optional wall 151 adjacent ring 104 on an opposite side prevents spiral fiber portion 122 from slipping out in the other direction. In some embodiments of the invention, wall 151 is stationary and does not move with ring 104. Stationary fiber portion 128 optionally exits reel 100 through a slit 154 in wall 151, which being stationary allows unobstructed exit of fiber portion 128.

In some embodiments of the invention, wall 101 rotates with ring 104. Indeed, ring 104 and wall 101 may be fabricated as a single piece. For example, ring 104 and wall 101 may be defined by carving out a portion of a raw material plate.

Optionally, a bearing 107 attached to wall 101 rotates with wall 101 and ring 104 relative to shaft 138, wall 101 serving to connect ring 104 to bearing 107. In other embodiments of the invention, wall 101 is stationary and a plurality of spikes connect ring 104 and bearing 107.

Wall Details

In some embodiments of the invention, in which wall 101 rotates with ring 104, wall 101 has a circular disk shape to facilitate easy rotation. Alternatively, other wall shapes may be used. Possibly, wall 151 has a same shape as wall 101. Optionally, wall 101 and wall 151 have a radius which extends beyond ring 104, such that their annular portion beyond ring 104 prevents useable fiber portion 132 from slipping off ring 104. Alternatively, only one of walls 101 and 151 extends beyond the outer radius of ring 104 or even neither extends there beyond. While in some embodiments walls 101 and 151 may be continuous without perforations, except for slit 154, to prevent accumulation of dust and dirt, in other embodiments wall 101 and/or wall 151 may be perforated, for example having a mesh geometry. Walls 101 and/or 151 may be opaque or may be transparent, allowing the user to observe the changes in spiral fiber portion 122.

Operation

In some embodiments, a spring is connected between shaft 138 and ring 104 in a manner which exerts a tangential force which urges fiber 102 to wind onto ring 104. In an exemplary embodiment, a rectangular spiral spring (motor spring) wrapped on shaft 138 and attached to wall 101, is used. Thus, useable fiber portion 132 is kept taut when connecter 103 is connected to an optical socket and excess fiber length does not tangle, snag or snare in a manner which may interfere with other devices or a human user.

In other embodiments, ring 104 is not spring loaded relative to shaft 138, and the user manually wraps fiber portion 132 onto ring 104, when desired.

It is noted that the useable fiber portion 132 may optionally be extracted from reel 100 while the fiber is in use, without interfering with the transmission of light through fiber 102.

Anchoring

As described above, fiber 102 is attached to reel 100 at two points: a stationary anchor point 105 and a rotating anchor point 106. While specific suggested anchor points have been stated above, other anchor points which serve same goals may be used. For example, alternatively to fiber portion 128 being anchored directly to shaft 138 at anchor point 105, fiber portion 128 may be anchored to wall 151 or to any other suitable stationary part of reel 100. Anchor point 106 is optionally on the inner surface of ring 104 so as not to interfere with the wrapping of useable fiber portion 132 on the ring 104.

As mentioned above, various anchoring methods may be used, including clamps and/or adhesives. In some embodiments of the invention, the anchoring is achieved by defining a narrow slit in the wall to which the fiber is attached and wedging the fiber into the slit.

Ring

Ring 104 is optionally formed as a continuous circular surface, except for a single hole (e.g., near anchor point 106) through which fiber 102 passes between the interior of ring 104 and its exterior. The single hole may extend only over a portion of the width of ring 104, possibly requiring threading of fiber 102 through the hole during manufacture, or may be a slit which extends to an edge of ring 104 or may even extend over the entire width of ring 104. Alternatively to a continuous surface, ring 104 may be formed of a plurality of arc-shaped segments separated by recesses.

While ring 104 is shown as having a round cross-section, this is not necessary and in some embodiments a ring with an oval cross-section is used, having a maximal curve beneath the critical radius of fiber 102.

In some embodiments of the invention, ring 104 is thin and has a width of only a single fiber, such that the rounds of fiber 132 overlap one on top of the other. Alternatively, ring 104 is wider than a single fiber, to allow carrying a larger number of rounds of fiber on reel 100. The surface of ring 104 may be flat, or may be threaded for fitting loops of fiber 132 in predetermined locations on the width of surface 110.

Spiral Fiber Portion

Referring in more detail to spiral fiber portion 122, in some embodiments of the invention, when reduced to a minimal diameter, at least some of the extent of fiber portion 122 lies directly on shaft 138. Shaft 138 may be covered with a suitable cover adapted to prevent damage to the optical fibers or the fiber may lie directly on the shaft. The radius of shaft 138 is optionally selected to be at least the critical radius of curvature of optical fiber 102 required to prevent damage thereto. In an exemplary embodiment of the invention, for a fiber having a critical bend diameter of 25 millimeters a diameter at least 10% larger, e.g., 28 millimeters, is used. Alternatively, spiral fiber portion 122 surrounds an inner ring protruding from wall 101 and/or an inner ring protruding from wall 151.

Spiral fiber portion 122 optionally has at least the length required to wind around shaft 138 the number of times which useable fiber portion 132 winds around ring 104. In addition, spiral fiber portion 122 optionally has a length shorter than useable fiber portion 132, so that it can fit within ring 104 without bending in a manner which may damage the fiber or attenuate or otherwise adversely affect its optical properties.

When useable fiber portion 132 is entirely wound around ring 104, spiral fiber portion 122 is arranged in a relatively limited number of rounds, of relatively large diameter. When useable fiber portion 132 is pulled off of ring 104, the number of rounds of spiral fiber portion 122 increases and their average diameter decreases.

Optionally, the rounds of spiral portion 122 lie one on top of the other in a most wound position, such that the width of the spiral portion is very thin. Alternatively, to allow for more leeway, a plurality of rounds of spiral portion 122 may lie together on shaft 138. Spiral fiber portion 122 is held such that it does not bend a substantial amount, optionally not more than the critical bending radius defined for the fiber in its specification.

In some embodiments of the invention, spiral fiber portion 122 is reinforced with an extra protective cover and/or accompanying wire, not included with useable fiber portion 132, to help the fiber endure the strains of winding and unwinding. The reinforcement optionally includes a sleeve 146, such as a metal or plastic sleeve which covers spiral fiber portion 122. The sleeve 146 may cover the entire length of spiral portion 122 or may cover only one or more sub-portions of spiral portion 122, for example portions considered most vulnerable. Alternatively or additionally, the reinforcement includes a strong and flexible wire, optionally a metal wire, which extends along spiral fiber portion 122. In some embodiments of the invention, the reinforcement of spiral fiber portion 122 comprises an elastic material which applies a retrieval force on fiber portion 132, instead of, or in addition to, a retrieval spring.

In some embodiments of the invention, reel 100 includes a stopper mechanism which prevents rotation of the reel beyond that required for complete release of useable fiber portion 132 and/or beyond complete wrapping of fiber portion 132. Alternatively or additionally, spiral portion 122 is designed to endure pressures and prevent winding or unwinding beyond the allowed limits. For example, a spring used to retract useable fiber portion 132 onto ring 104 may be designed to reach it contraction limit when fiber portion 132 is entirely unwrapped from ring 104.

The maximal length of useable fiber portion 132 is optionally a function of the diameter of ring 104, larger rings 104 allowing for longer useable fiber portions. For a given diameter of ring 104, a length of spiral fiber portion 122 which allows for a maximal length of useable fiber portion 132 is optionally selected, and accordingly the length of fiber portion 132 is defined. In an exemplary embodiment of the invention, ring 104 has a diameter of 10 centimeters. Spiral fiber portion 122 has a length of about 1.47 meters which when wrapped closely around a shaft 138 having a diameter of 28 millimeters, extend over 9 loops one on top of the other. Useable fiber portion 132 has a length of about 1 meter which when wrapped on ring 104 includes about 3.5 rounds around ring 104. Naturally, larger and smaller reels 100 may be used, depending on the purpose of the reel. The size of the reel may be selected according to the required length of useable fiber portion 132. For example, when used inside a mechanical switch, the reel may be very small, for example for a useable fiber portion 132 of less than 5 centimeters or even less than 1 centimeter.

Additional Embodiment

Figure 3:
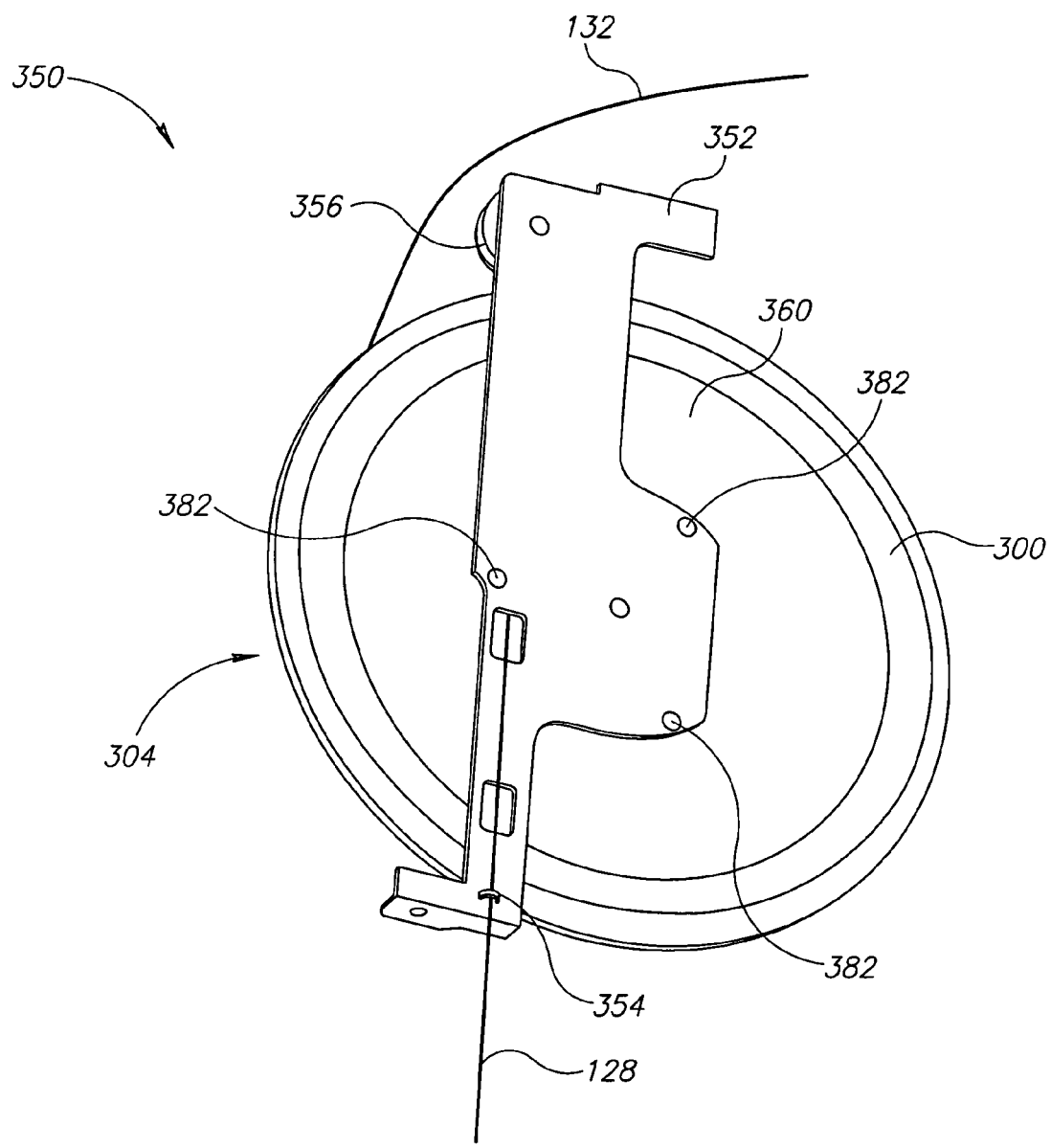
FIG. 3 is a schematic back view of a fiber storage reel, in accordance with another exemplary embodiment of the invention.

FIG. 3 is a schematic back view of a reel 350 formed of a rotating unit 300, a recess wall 360 and a base 352, in accordance with another exemplary embodiment of the invention.

Figure 4:
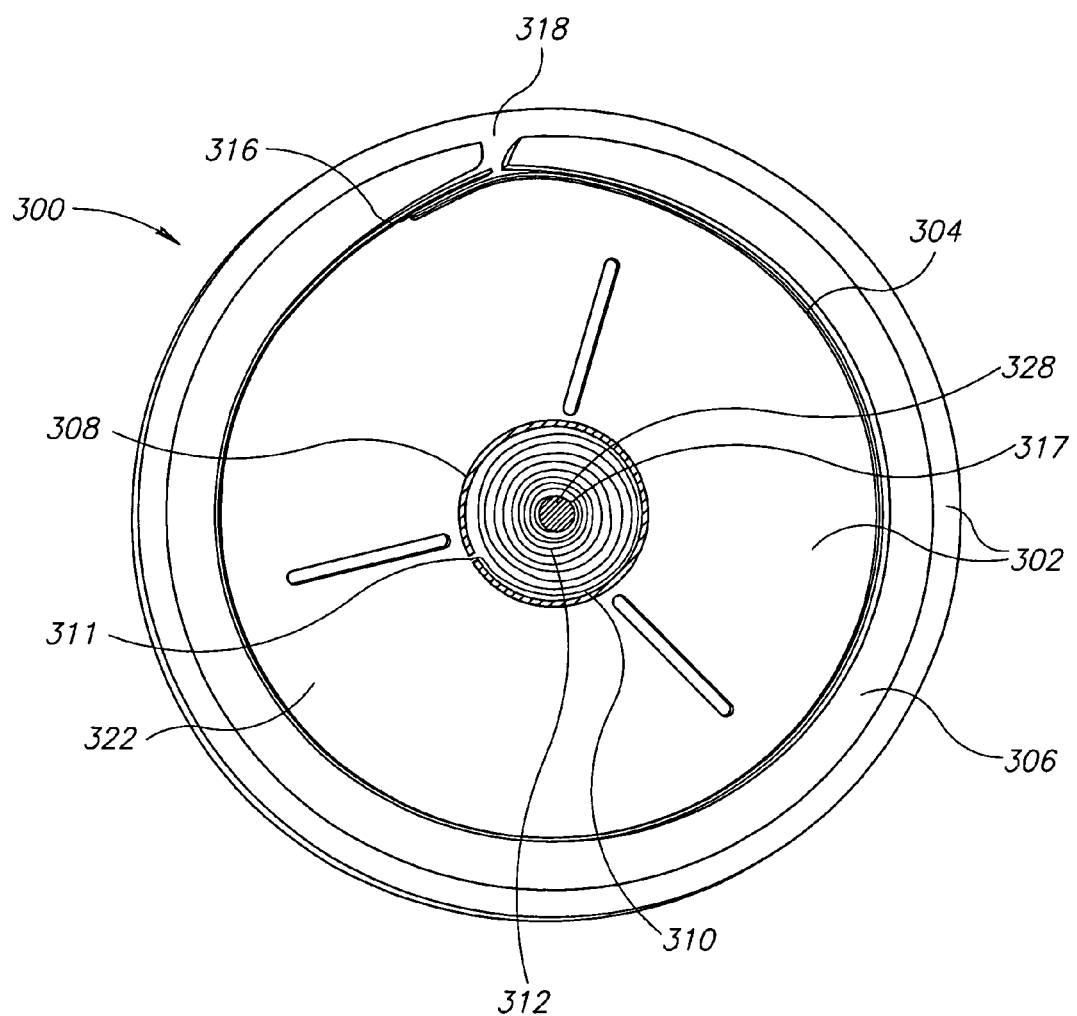
FIG. 4 is a schematic illustration of a rotating unit of the reel of FIG. 3.

FIG. 4 is a schematic illustration of rotating unit 300 of reel 350 of FIG. 3. Rotating unit 300 comprises a round wall 302 from which a circular shelf 304 extends orthogonally. The outer surface of circular shelf 304 is adapted for receiving the useable fiber portion 132 (FIG. 3) thereon, for example by being smooth to prevent damage to the fiber. Circular shelf 304 optionally has rails which prevent the fiber from slipping off the shelf, on both sides of its outer surface. Optionally, on one side, an outer annular portion of wall 302 serves as the rail. On the other side, a separate rail 306 is provided. In this embodiment, both rails rotate with circular shelf 304, preventing problems with fiber segments which may be pressed between a rotating rail and a stationary rail.

As shown, rail 306 is lower than the rail which is part of wall 302. In other embodiments, however, rail 306 is the same height as the rail belonging to wall 302, or may be higher than the rail of wall 302.

An inner circular protrusion 308, extending from wall 302 defines a cavity 310 which hosts a spiral spring 312. Spring 312 connects between rotating unit 300 and stationary base 352, such that the spring is loaded when fiber 132 is released and exerts force attempting to retract the fiber onto shelf 304. Spring 312 is optionally connected on its outer end to protrusion 308 and/or directly to wall 302. In an exemplary embodiment of the invention, protrusion 308 defines a slit 311 which receives an end of spring 312 and thus connects to the spring. An inner end 317 of spring 312 is optionally adapted to fit into a slit 329 in a pivot 324 (FIG. 5) fixed to base 352. A cover (not shown) may be provided over recess 310 to prevent dirt from entering into the recess. A screw 328 optionally connects the cover to a screw hole in pivot 324 and prevents rotating unit 300 from falling off of base 352.

An annular recess 322 defined between circular shelf 304, protrusion 308 and wall 302 serves as a housing for spiral fiber portion 122 (FIG. 2).

In some embodiments of the invention, circular shelf 304 is not closed, but rather features overlapping edges which define a narrow channel 316 in which a fiber is placed and tightly gripped by the opposite edges of circular shelf 304. Circular shelf 304 optionally comprises in these embodiments a suitable material which on the one hand is sufficiently elastic to allow insertion of the fiber, while being sufficiently stiff to grasp the fiber and prevent its escape from narrow channel 316 or its sliding within the channel. Alternatively or additionally, an adhesive, a mechanical grasper and/or another attachment mechanism may be used to hold the fiber in place.

Rail 306 optionally has a small entrance 318 defined therein, adjacent narrow channel 316, allowing easy loading of an optical fiber onto rotating unit 300, without needing to thread the fiber through a hole in shelf 304.

Figure 5:
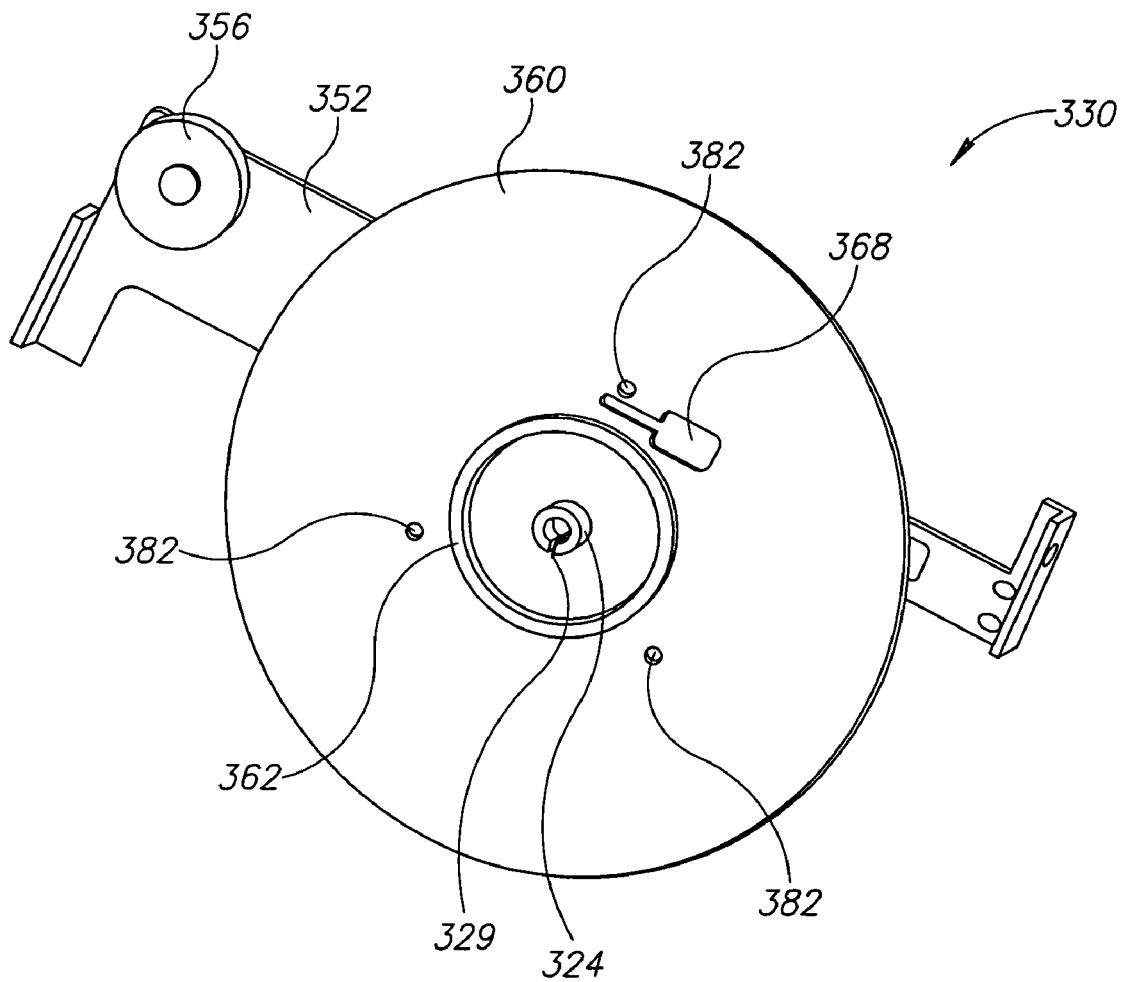
FIG. 5 is a schematic illustration of a stationary unit of the optical fiber storage reel of FIG. 3.

FIG. 5 is a schematic illustration of a stationary unit 330 of optical fiber storage reel 350 (FIG. 3). Stationary unit 330 comprises base 352 which serves to lead a fiber into the roller and may be used to hold and/or hang the roller. Stationary base 352 may be of any suitable shape for hanging and otherwise handling. Optionally, base 352 includes a port 354 (FIG. 3) which grasps the stationary fiber portion 128, outside the reel, such that its connection to the reel is in a desired manner and is not affected by movements of the reel. In a similar manner, base 352 optionally includes an exit reel 356, which controllably feeds useable fiber portion 132 coming from circular shelf 304.

Stationary unit 330 further comprises a recess wall 360 which is optionally sized and shaped to cover recess 322 (FIG. 4) and prevent spiral fiber potion 122 from falling out of the recess. Wall 360 optionally includes an inner circular protrusion 362 adapted to protrude into annular recess 322 (FIG. 4) and serve as a base for spiral fiber potion 122. Inner circular protrusion 362 optionally additionally serves as a bearing for relative movement against inner circular protrusion 308. Protrusion 362 optionally has a diameter greater than the critical bending diameter of the optical fiber as discussed above. As shown, three screws 382 connect recess wall 360 to base 352. It is noted, however, that any other connection apparatus may be used or base 352 and wall 360 may be manufactured together as a single piece.

In some embodiments of the invention, wall 360 includes an aperture 368 through which fiber portion 128 enters recess 322. Optionally, aperture 368 is sufficiently large to allow entrance of a fiber with a standard fiber connector at its end. A cover (not shown) may be provided to cover aperture 368 and prevent entrance of dust therethrough into the reel.

Figure 6:
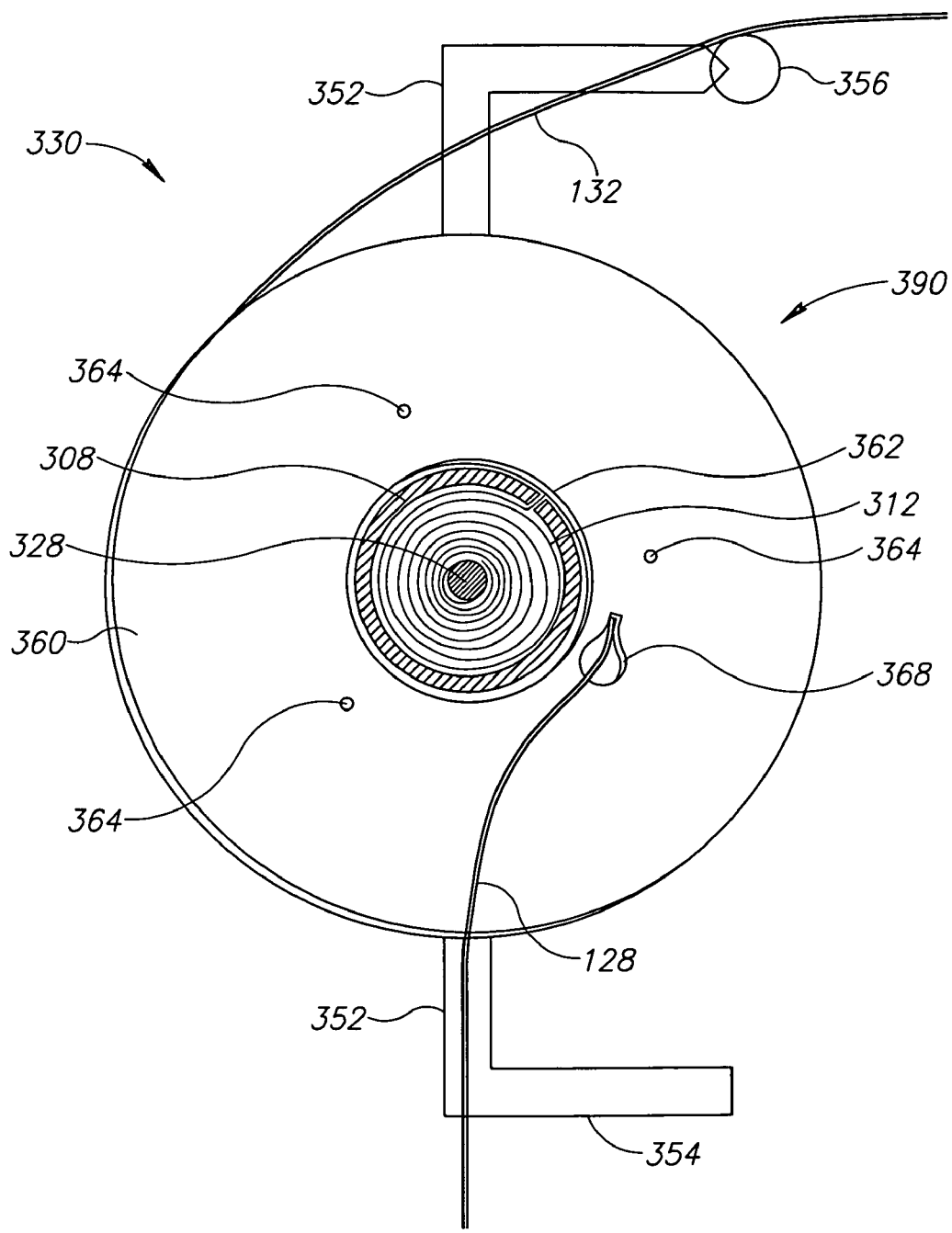
FIG. 6 is a schematic front view of a reel, in accordance with still another exemplary embodiment of the invention.

FIG. 6 is a schematic front view of a reel 390, in accordance with another exemplary embodiment of the invention. Reel 390 differs from reel 350 of FIG. 3, in that rotating unit 300 is located between base 352 and wall 360, rather than base 352 and wall 360 being connected adjacent to each other. Screw holes 264 are provided to connect to a cover (not shown) which grasps screw 328 and covers spring 312. Alternatively or additionally to connecting the rotating unit and the stationary unit by a central pivot, the stationary portion may define a cage in which the rotating portion of the reel rotates.

Conclusion

It is noted that fiber 102 stored on the above described reels may be a single channel fiber or may comprise a bundle of fibers, for example two or four fibers, which are wound together. While the above description relates to optical fibers, similar devices may be used with other filamentary members.

It will be appreciated that the above described methods may be varied in many ways, including, changing the specific elements used and their layout. It should also be appreciated that the above described description of methods and apparatus are to be interpreted as including apparatus for carrying out the methods and methods of using the apparatus. The present invention has been described using non-limiting detailed descriptions of embodiments thereof that are provided by way of example and are not intended to limit the scope of the invention. Many specific implementation details may be used.

It should be understood that features described with respect to one embodiment may be used with other embodiments and that not all embodiments of the invention have all of the features shown in a particular figure or described with respect to one of the embodiments. Variations of embodiments described will occur to persons of the art. Furthermore, the terms "comprise," "include," "have" and their conjugates, shall mean, when used in the claims, "including but not necessarily limited to."

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims.

We claim:

1. An optical fiber storage unit, comprising:
   a stationary unit;
   a ring adapted to rotate relative to the stationary unit;
   a pair of walls on opposite sides of the ring; and
   an optical fiber confined within a volume defined by the walls and the ring fixedly attached at a first point to the stationary unit and at a second point to the ring, such that the optical fiber portion between the first and second points is arranged as a spiral which changes its number of rounds when the ring is rotated relative to the stationary unit and preserves a bending radius above a critical bending radius of the optical fiber, but the optical fiber portion beyond the first point is not twisted by rotation of the ring,
   wherein a first one of the walls rotates with the ring and a second one of the walls is stationary relative to the ring.

2. The fiber storage unit of claim 1, wherein the stationary unit comprises a pivot around which the ring rotates.

3. The fiber storage unit of claim 2, wherein the fiber portion between the first and second attachment points is arranged so that at least a part thereof rests on the pivot.

4. The fiber storage unit of claim 1, comprising a rotatable wall attached to the ring, which rotates with the ring.

5. The fiber storage unit of claim 4, wherein the stationary unit comprises a stationary wall which together with the rotatable wall and the ring defines a recess in which the spiral fiber portion is positioned.

6. The fiber storage unit of claim 5, wherein the fiber portion between the first and second attachment points is arranged so that at least a part thereof rests on a circular protrusion from the stationary wall, having a radius greater than a critical radius of curvature of the fiber.

7. The optical fiber storage unit of claim 5, wherein the stationary wall defines an aperture through which the optical fiber beyond the first point exits the storage unit, and wherein the aperture is located beyond a critical bending radius of the optical fiber from a central point around which the ring rotates.

8. The fiber storage unit of claim 1, wherein the fiber passes through an opening in the stationary wall.

9. The fiber storage unit of claim 1, wherein an outer surface of the ring is adapted to have a portion of the fiber wrapped there around.

10. The fiber storage unit of claim 9, comprising a rail on the ring which prevents the fiber on the ring from slipping off.

11. The fiber storage unit of claim 10, wherein the ring has rails on both sides, which rotate with the ring.

12. The fiber storage unit of claim 1, wherein the optical fiber is of a type that is degraded substantially when twisted more than two rounds.

13. The fiber storage unit of claim 1, wherein the fiber portion beyond the first point is not substantially moved by rotation of the ring.

14. The optical fiber storage unit of claim 1, wherein when the ring is rotated relative to the stationary unit the optical fiber preserves a bending radius above a critical bending radius of the fiber over its entire length.

15. The optical fiber storage unit of claim 1, wherein the ring has a width of only a single fiber.

16. The optical fiber storage unit of claim 1, wherein the optical fiber portion between the first and second points is reinforced with an extra protective cover or an accompanying wire not included with the optical fiber portion beyond the first point.

17. The optical fiber storage unit of claim 1, wherein the optical fiber portion beyond the first point has a length of less than 5 centimeters.

18. The optical fiber storage unit of claim 1, wherein no part of the spiral fiber portion is located within a length of a critical bending radius of the optical fiber from a central point around which the ring rotates.

19. The optical fiber storage unit of claim 1, wherein the optical fiber portion beyond the first point has a length of less than 1 meter.

20. A method of handling an optical fiber, comprising:
connecting the optical fiber to a storage reel at a first point which is stationary and at a second point which is rotatable, such that the fiber between the first and second points is organized as a spiral;
wrapping the optical fiber around a ring of the reel, by rotating the ring; and
wrapping and unwrapping the optical fiber from the ring for usage of different lengths of the fiber,
wherein the storage reel includes a pair of walls on opposite sides of the ring, such that the fiber between the first and second points is confined within a volume defined by the walls and the ring, and
wherein a first one of the walls rotates with the ring and a second one of the walls is stationary relative to the ring.

* * * * *